United States Patent [19]

Bennett et al.

[11] Patent Number: 4,736,913
[45] Date of Patent: Apr. 12, 1988

[54] FLUID FLOW CONTROL DEVICE

[75] Inventors: John A. Bennett; Robert J. Englar; Andrew S. W. Thomas, all of Marietta, Ga.

[73] Assignee: Lockheed Corporation, Calabasas, Calif.

[21] Appl. No.: 909,349

[22] Filed: Sep. 19, 1986

[51] Int. Cl.⁴ .............................................. B64C 21/04
[52] U.S. Cl. .................................... 244/130; 244/207; 244/119
[58] Field of Search ............. 244/119, 130, 207, 17.19

[56] References Cited

U.S. PATENT DOCUMENTS 2,041,791  5/1936  Stalker ................................ 244/207
3,066,894 12/1962  Davidson ........................... 244/207
3,419,232 12/1968  McStay et al. ..................... 244/119
3,807,662  4/1974  Velazquez ......................... 244/17.19

Primary Examiner—Galen Barefoot
Attorney, Agent, or Firm—Eric R. Katz

[57] ABSTRACT

A fluid flow control device controllably maintains attached flow in the region of a body having a contour of rapid curvature utilizing tangential fluid discharge slots, positioned just upstream from the separation line, which issue a thin jet sheet to energize the boundary layer and entrain the surrounding flow. When applied to the aft fuselage of an aircraft, the device reduces separation and vortex drag at cruise and provides control forces and moments during low speed operation of the aircraft.

3 Claims, 2 Drawing Sheets

U.S. Patent Apr. 12, 1988 Sheet 2 of 2 4,736,913

FLUID FLOW CONTROL DEVICE

TECHNICAL FIELD

The present invention generally relates to a fluid control device for controllably maintaining attached flow in the region of a body having a contour of rapid curvature, where flow separation and vortex roll-up are known to exist and, more particularly, to a fluid flow control device for minimizing drag, reducing undesirable vortex formation, and controlling fluid flow separation as well as providing control forces and moments.

BACKGROUND ART

To meet operational requirements, it is often necessary to design the body of a vehicle that moves through a fluid with a configuration that generates an undesirable flowfield having detrimental consequences such as fluid flow separation and vortex formation, each of which contributes to the overall drag of the vehicle. One example of such a configuration is seen when providing the aft fuselage of an aircraft with an upswept shape to accept a cargo door and ramp.

The flowfield typically produced by the upswept fuselage is characterized by a three-dimensional boundary layer with significant cross-flow regions on the fuselage. This boundary layer separates into a pair of counter-rotating vortices, trailing downstream. The resultant flow is analogous to that associated with a missle at high angle of attack or a delta wing, but without the sharp leading edge.

The total drag resulting from this kind of flow can be split into two components. First, there is the pressure drag that arises because of the reduced pressure on the lower surface of the fuselage. In addition, there may be a considerable loss of flow energy in the form of rotational kinetic energy of the vortex structures and this is manifested as a vortex drag component. Depending on the geometry of the aircraft, the relative contribution of each drag component varies.

For reducing the drag associated with this kind of flowfield, the best approach is to attempt to optimize the geometry of the configuration at the design stage. Thus, high-up sweep angles should be avoided. Also, slender fuselages with little or no flatness in cross-section should be used since these minimize the area exposed to the low pressure. In many applications, however, it is not possible to optimize the geometry due to the need to meet structural and operational requirements, and significant amounts of vortex drag can result.

The use of strakes, as disclosed in U.S. Pat. No. 3,419,232 to McStay, et al., has been employed to reduce vortex drag. These strakes are essentially small vertical plates or fins placed beneath the fuselage and designed to be embedded in the vortex flow. They act to reduce the intensity of the swirl of the vortex structures and so reduce the vortex drag. However, the strakes contribute to drag associated with skin friction and carry a weight penalty resulting in increased fuel consumption as well as a reduced payload capacity.

Recently, increased emphasis has been directed at designing short takeoff and landing (STOL) aircraft having efficient cruise performance at relatively high speeds as well as having the ability to takeoff and land at slow speeds in a relatively short distance. To develop adequate lift for the aircraft during low speed operation, such aircraft commonly utilize powered-lift systems wherein the jet exhaust from the engines is diverted downward by a flap system on the lifting wing to increase lift.

However, advanced STOL aircraft employing powered-lift systems are able to fly at such low approach and takeoff speed that conventional aerodynamic control surfaces cannot adequately provide control forces for pitch, roll, and yaw inputs due to the associated low dynamic pressures. The conventional approach to this problem has been to provide the STOL aircraft with enlarged control surfaces positioned as far from the center of gravity as possible and having double-element rudders and elevators to obtain increased aerodynamic force. This solution results in added weight, complexity in operation, increased unreliability due to complexity, and increased drag at cruise speed due to the large size of the control surfaces. An alternative approach involves the use of thrust nozzles mounted at the ends of the fuselage and wings. Again, this solution results in added complexity and weight as well as reduction in available engine thrust, the source of propulsion for the thrust nozzles.

In general, solutions to the cruise drag and STOL control surface problems have been treated individually, not in a synergistic manner wherein one common device may resolve both problems.

DISCLOSURE OF THE INVENTION

Accordingly, it is an object of the present invention to provide a fluid flow control device which reduces drag due to undesirable vortex formation and fluid flow separation at cruise speed aerodynamic force generation to increase control moments at the low speeds associated with STOL operation.

It is another object of the present invention to provide a fluid flow control device which reduces cruise drag and provides a low speed sideforce and yawing moment generator, but causes no detriment to the aircraft's overall performance when not in use.

It is yet another object of the present invention to provide a fluid flow control device which provides both drag reduction and aerodynamic force and moment generation without requiring the mechanical deflection of a control surface or element.

One advantage of the present invention is that it employs tangential blowing on an existing circular or near-circular vehicle component, such as, for example, the aft fuselage of an aircraft, to furnish a no-moving-part aerodynamic control surface capable of force generation nearly nine times as great as a conventional airfoil or three to four times that of a flapped airfoil.

Yet another advantage of the present invention is that it is not limited to performance at a single design point because flow rate variation adjusts the performance to the required need.

Another advantage of the present invention is that it is simple in construction and operation and it provides superior control and performance enhancement in the aircraft without any required configuration change to the aircraft. No mechanical control surface deflections are required.

Still another advantage of the present invention is that it utilizes components of the aircraft which are normally only external wetted surfaces which normally produce parasitic drag and employs these surfaces as drag reducing agents and aerodynamic control surfaces to augment conventional control surfaces. These conventional surfaces may thus be increased significantly in size. Another very significant advantage is that the same system performs both the cruise drag reduction and the low-speed force augmentation with no mechanical conversion between the two functions. This conversion is simply a matter of an internal flow control valve to adjust the direction and amount of blowing.

Another significant advantage is an increase in control responsiveness since control surface response time is nearly instantaneous, as the controlling blowing fluid may move at or near the speed of sound.

In accordance with these and other objects, features, and advantages of the present invention, there is provided a fluid flow control device for controllably maintaining attached flow in the region of a body having a contour of rather rapid curvature where fluid flow separation and vortex roll-up are known to exist to thereby minimize drag by reducing undesirable vortex formation and controlling fluid flow separation, as well as provide low-speed control forces and moments.

Accordingly, the fluid flow control device of the present invention for controllably maintaining attached fluid flow over a body moving relative to a fluid comprises a source of compressed fluid and a fluid discharge slot slots for discharging the compressed fluid tangentially to the fluid flow in the vicinity of the chine where fluid flow separation is known to exist for a given relative fluid flow velocity and at a flow rate sufficient to attach the fluid flow to the body downstream of the chine.

Further in accordance with the present invention, the fluid flow control device comprises a flow rate control means for controlling the flow rate of the compressed fluid discharged from the fluid discharge slot or slots.

The present invention is further characterized as a fluid flow control device for controllably maintaining attached fluid flow at cruise speeds over the upswept aft fuselage of an aircraft wherein fluid discharge slots for providing tangential blowing are positioned on each side of the aft fuselage in the vicinity of the region where fluid flow separation and vortex roll-up are known to exist, the fluid discharge slots issuing a thin jet sheet which remains attached to the fuselage surface and energizes the boundary layer to entrain the surrounding flow thereby controlling fluid flow separation and reducing undesirable vortex formation.

The present invention is also characterized as a fluid flow control device for providing a control force by increasing fluid flow circulation over a portion of the aft fuselage of a poweredlift STOL aircraft, the aft fuselage being immersed in the downwash flow field behind the lifting wing and having a substantially circular or near-circular cross-section. The fluid flow control device comprises fluid discharge slots for selectively providing tangential blowing on either side of the aft fuselage and a fluid flow selection means for controlling the fluid flow issued from each discharge slot at a fluid flow rate independent of the other so as to selectively energize the boundary layer and entrain the local flowfield of one side of the fuselage to increase fluid flow circulation over the selected side, thereby creating an aerodynamic force substantially normal to the surface of the fuselage to provide side force generation and yawing moment control for the aircraft during STOL operation.

BEST MODE FOR CARRYING OUT THE INVENTION

Figure 1A:
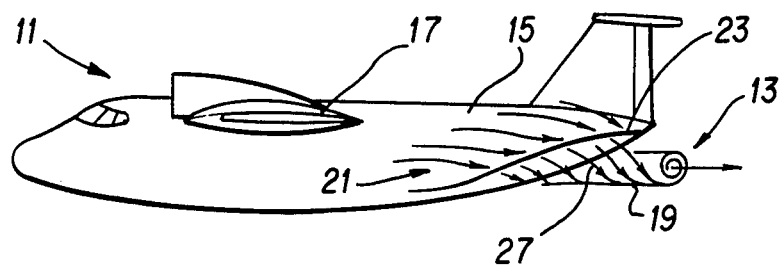
FIGS. 1A and 1B are side and rear views, respectively, of a fluidic vehicle having a body configuration that generates an undesirable flow fluid, such as fluid flow separation and vortex roll-up as the vehicle moves relative to a fluid.
Figure 1B:
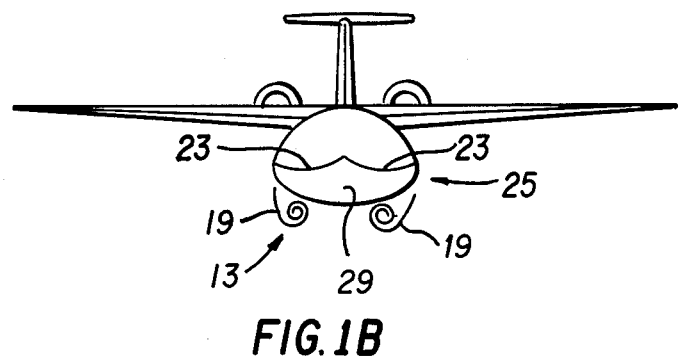

A fluidic vehicle, generally indicated at 11, is illustrated in FIGS. 1A-1B as having a body configuration that generates an undesirable aft flowfield, generally shown at 13, as the vehicle 11 moves relative to a fluid. The vehicle 11 shown is, for example, a cargo aircraft, such aircraft typically having an upswept afterbody or aft fuselage 15 in order to facilitate the loading and unloading of cargo via an aft cargo door. The aerodynamic flowfield 13 generated by the downwash from the lifting wing 17, usually positioned ahead of the upswept body 15, in combination with that of the body 15, is highly three-dimensional in form and can produce excessive aerodynamic drag forces on the vehicle 11. Both lift and drag forces produced on the afterbody 15 by the flowfield 13 are derived from frictional effects on the body surface due to the viscous nature of the fluid, pressure forces which are governed primarily by the fluid flow around the body 15 and the ability of a viscous boundary layer adjacent the body surface to remain attached. With a large amount of upsweep, these basis fluid flow properties combine so that a strong vortex system 19 is shed into the wake to produce vortex drag. The onset of vortex drag is usually accompanied by boundary-layer separation on the body surface which further compounds the aircraft's drag problem.

The development of frictional forces on a fluidic surface is confined chiefly to the action of the fluid within the boundary layer which is an extremely thin layer of fluid adjacent to the solid surface. Essentially, the fluid at the solid surface is at rest, while immediately above successive layers of fluid slide over each other thereby exerting a frictional drag force that is dependent on the viscosity of the flowing medium. It is desirable to keep the boundary layer attached to the surface thus precluding additional pressure drag force attendant to the separation of the boundary layer from the surface.

The tendency of the boundary layer to remain attached or to separate from the body surface is governed by the distribution of the surface pressures on the body itself. A positive presure gradient, i.e, an increasing level of static pressure, along with drag, tend to show the fluid motion and over an extended length of contact with the surface, the innermost portion of the fluid being brought to rest at the separation point. For the upswept afterbody 15, this effect results in a breaking away of streamlines, generally indicated at 21, from the body aft-surface leaving an area of low pressure 29, i.e., pressure drag, between two lines of separation points 23 on either side of the body 15. When there is a region of body having a contour of rapid curvature, as seen generally at 25 in FIG. 1B, the breakaway streamlines 27 roll up into the vortex pair 19 that trail downstream with significant amounts of wasted energy contained in the rotational flow.

Figure 2A:
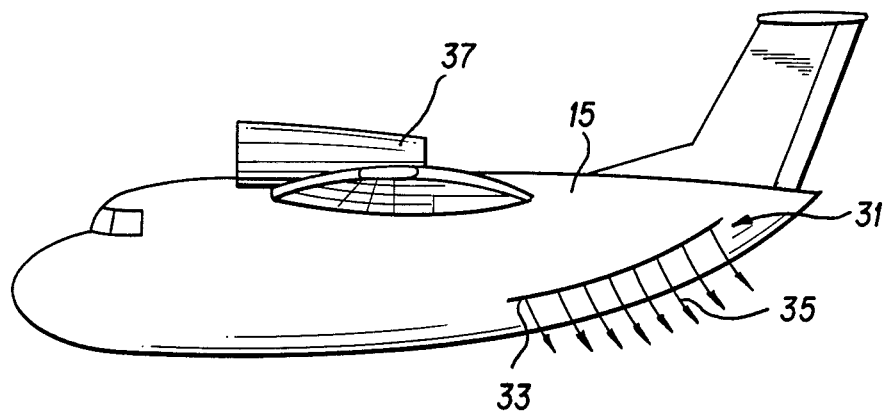
FIGS. 2A and 2B are side and rear views, respectively, of a fluidic vehicle to which the fluid flow control device of the present invention has been applied for reducing drag at cruise speed due to fluid flow separation and vortex roll-up.
Figure 2B:
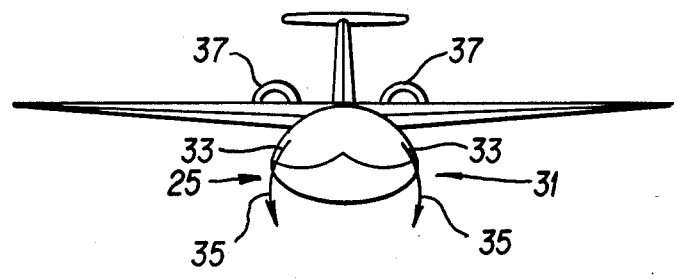

In order to convert the aft upswept fuselage 15 into both a cruise drag reducer as well as a low-speed control surface, the present invention proposes a fluid flow control device comprising a two-slotted blown fuselage as shown in FIGS. 2A-2B generally at 31. The fluid flow control device 31 is essentially a no-moving parts tangentially blown device intended to reduce both the separation and vortex drag produced on the aft fuselage 15 of vehicle 11 due to the rapid curvature of the contour. Moreover, the device 31 provides additional aerodynamic control moments, especially during the operation of a STOL powered-lift aircraft as will be described in further detail hereinafter.

Referring to FIGS. 2A-2B, the region of rapid curvature 25 produces boundary layer thickening and adverse pressure gradients which cause fluid flow separation, vortex formation and vehicle drag. The fluid flow control device 31 mitigates this drag inducement by using a long tangential blowing slot 33 positioned along each side of the aft fuselage 15 in the vicinity of the region 25 where the fluid flow separation and vortex roll-up have been found to exist. A thin jet sheet 35 is issued from each slot 33 substanially tangentially to the fluid flow and remains attached to the curved fuselage surface by the now well-known Coanda effect as used in the circulation control wing concept (see, for example, U.S. Pat. No. 4,387,869, "Mono-Element Combined Supercritical High Life Airfoil", R. J. Englar et al.).

Each slot 33 is positioned substantially perpendicular to the attached streamlines 21, preferably just upstream from region 25 where fluid flow separation line 23 has been determined to exist for a desired curved speed of the vehicle 11. As the jet sheet 35 traverses the curvature region 25, this jet energizes the boundary layer to counteract the increasing static pressure thus delaying flow separation and counteracting the rotation of the vortex roll-up. By varying the flow rate through the slots, drag due to both separation and vortex roll-up are mitigated. The source of compressed fluid for discharge from slots 33 is provided from engines 37, an internal valve or regulator controlling the flow rate as desired to provide for the most efficient cruise.

Figure 3:
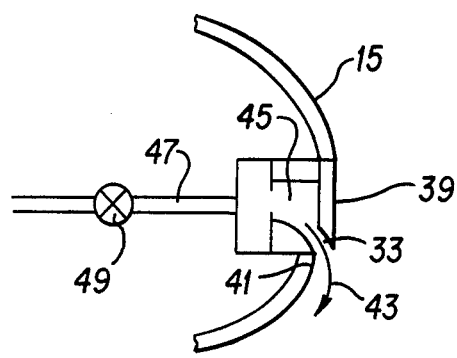
FIG. 3 is a front view, in section, of the fluid discharge slot positioned on the aft fuselage of the vehicle for energizing the boundary layer to facilitate attached flow.
Figure 4:
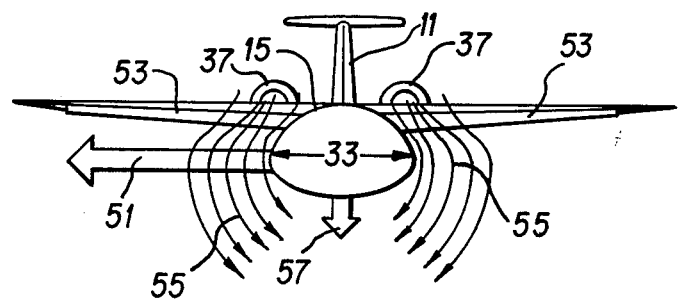
FIG. 4 is a rear view of the fluid flow control device of the present invention wherein a single discharge slot is operated to generate control forces and moments.

FIG. 3 is a detailed sectional view of one slot 33 of the fluid flow control device 31. The discharge slot 33 comprises a slot lip 39 which forms the portion of the slot 33 and a turning surface 41 which forms the inner portion of the slot 33. Preferably, the slot lip 39 forms a portion of the wetted surface of the aft body 15 and additionally, has a reduced thickness near the downstream edge thereof as seen in FIG. 3. The turning surface 41 is provided with a curved contour such that discharged compressed fluid 43 becomes attached thereto and is discharged substantially tangentially to the fluid flow along the body 15.

Compressed fluid is supplied to plenum 45 from a suitable source of compressed fluid, for example, engine 37 via conduit 47. A valve 49 provides a flow rate control means for controlling the flow rate of compressed fluid discharged from the slot 33 and also provides a fluid flow selection means for selectively operating a single slot 33 independently of the other. The importance of the latter feature becomes apparent with reference to the following preferred embodiment of the invention as a side force generator.

During STOL operation of vehicle 11, flaps 53 are lowered to deflect jet thrust from engines 37 resulting in a large downwash region 55 behind the lifting wing's high-lift system. As a result, the aft fuselage 15 of vehicle 11 is immersed in this downwash 55 having a flow direction across fuselage 15 substantially from top to bottom. Because fuselage 15 is substantially circular in cross-section, the peculiar downwash 55 associated with STOL operation of powered-lift aircraft permits the use of the fluid flow control device 31 as a side force generator when a single slot 33 is selectively employed to energize the boundary layer and entrain the local flowfield along a side of the fuselage 15 thereby increasing circulation over the surface to create aerodynamic force 51 which is substantially perpendicular to the aft fuselage surface as shown.

By characterizing the aft fuselage 15 as a circulation control cylindrical airfoil, with the fluid flow direction across the fuselage 15 being from top to bottom, the slots 33 are positioned on the effective rounded trailing edge of the airfoil, preferably between the 70% and 90% chord length. Blowing of a single slot 33 produces very high lift and drag on the fuselage cylinder relative to the downward flow direction. However, relative to the freestream surrounding the aircraft, these forces are actually a side force 51 and negative lift 57, respectively, which convert into yawing moment and nose-up pitching moment. No external moving parts are required to vary these forces and moments, but only variation of the blowing rate by means of the valve 49. The aft fuselage 15 is thus converted into a very powerful control surface to augment the existing vertical and horizontal stabilizers, which do not provide adequate control power in very low-speed flight.

While the invention has been particularly shown and described with reference to preferred embodiments thereof, it will be understood by those skilled in the art that various alterations in form and detail will be made therein without departing from the spirit and scope of the attached claims.

What is claimed is:

1. In combination with a STOL aircraft having a highlift wing and a fuselage with an upswept aft portion having a surface contour of rapid curvature on each side where fluid flow separation has been determined to exist for a relative fluid flow velocity, the high-lift wing and fuselage being arranged such that at least a section of the aft portion of the fuselage is immersed in a large downwash of high velocity fluid flow behind the high-lift wing having a flow direction which is substantially from top to bottom during STOL operation of the aircraft, a fluid flow control device comprising:

(a) a source of compressed fluid;

(b) at least a pair of fluid flow discharge slots for selectively discharging the compressed fluid tangentially to the downwash of high velocity fluid flow in the vicinity of the aft portion of the fuselage having a contour of rapid curvature on each side of the fuselage, said pair of fluid discharge slots being positioned substantially symmetrically on each side of the aft portion of the fuselage;

(c) a flow rate control means for controlling the flow rate of the fluid discharged from said fluid discharge slots at a rate sufficient to prevent fluid flow separation in the vicinity of the aft portion of the fuselage having a contour of rapid curvature where fluid flow separation has been determined to exist for a given flow relative fluid flow velocity;

(d) a fluid flow selection means for selectively operating said pair of fluid discharge slots independently of the other; and (e) at least a portion of the upswept aft portion of fuselage having a substantially circular cross-section, whereby when the aft portion of the fuselage is immersed in the downwash of high velocity fluid flow having a flow direction across the fuselage which is substantially from top to bottom during STOL operation of the aircraft, said fluid flow control device operates as a side force generator when one of said pair of fluid flow discharge slots is selectively employed to both energize the boundary layer and entrain the local flowfield in the vicinity of the region of the aft portion of the fuselage having a contour of rapid curvature along one side of the fuselage to thereby increase fluid flow circulation over said one side of said fuselage and create an aerodynamic force substantially perpendicular to the surface of the aft fuselage on which said one of said pair of discharge slots is operated.

2. A fluid flow control device according to claim 1 wherein each of said fluid discharge slots comprises:

(a) a slot lip which forms the upstream portion of said slot; and (b) a turning surface which forms the downstream portion of said slot, said turning surface being curved such that the discharged compressed fluid becomes attached thereto and is discharged from said fluid flow slot substantially tangentially to the surrounding fluid flow.

3. A fluid flow control device according to claim 2, wherein said pair of fluid flow discharge slots are positioned on the side of the fuselage between about the 70% and about the 90% chord length viewing the fuselage as a cylindrical airfoil from top to bottom.

* * * * *